July 8, 1958 S. KUBA 2,842,370
HOLDING FIXTURE
Filed Nov. 29, 1954
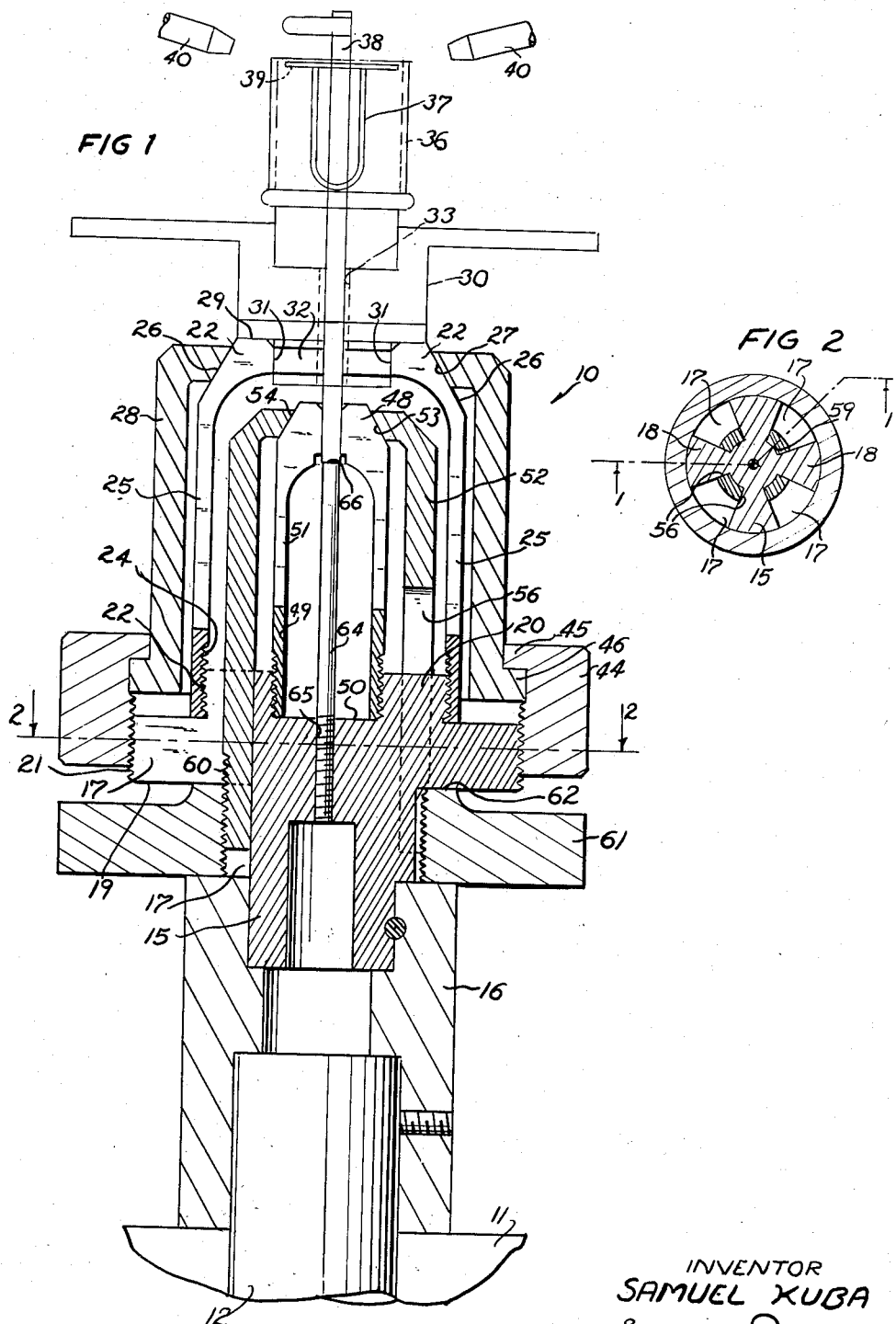
INVENTOR
SAMUEL KUBA
By W. C. Parnell
ATTORNEY

United States Patent Office 2,842,370
Patented July 8, 1958

2,842,370

HOLDING FIXTURE

Samuel Kuba, Allentown, Pa., assignor to Western Electric Company, Incorporated, New York, N. Y., a corporation of New York Application November 29, 1954, Serial No. 471,774

3 Claims. (Cl. 279—46)

This invention relates to article holding fixtures particularly fixtures for holding parts centrally one within another in assembly.

In the manufacture of certain types of electrical units for use in the communication arts it is of great importance that certain parts of the articles be positioned accurately with respect to each other while being assembled. One example is a centrally apertured outer or base part of a tube-like structure in which a stem or inner part is to be positioned and eventually sealed to the outer part, it being of great importance that the center line of the inner part be coincident with the center line of the outer part.

The object of the present invention is a fixture which is simple in structure, readily actuable and highly efficient in holding inner and outer parts of an article for assembly.

With this and other objects in view, the invention comprises a fixture having inner and outer chuck-like portions actuable to receive inner and outer parts for mounting relative to each other in assembly.

In the present embodiment of the invention, the fixture has a main center line with resilient outer jaws disposed concentric therewith and adapted to close on an outer part to secure the part with its center line coincident with the main center line. The fixture also has resilient inner jaws disposed within the outer jaws and adapted to be moved into closed position on an inner part to secure the inner part with its center line coincident with the main center line and the center line of the outer part.

Other objects and advantages will be apparent from the following detailed description when considered in conjunction with the accompanying drawing, wherein:

Fig. 1 is an enlarged vertical sectional view of the fixture taken substantially along the line 1—1 of Fig. 2, and Fig. 2 is a reduced horizontal sectional view taken along the line 2—2 of Fig. 1.

The holding fixture indicated generally at 10 is one of many units spaced equally about a turret type table 11 and supported by vertical spindles 12 which are driven at certain intervals to rotate the holding fixtures about their vertical center lines which are in alignment with the axes of the spindles 12.

Only one of the holding fixtures is shown, this fixture including a main member 15 fixedly mounted in the upper end of a coupling or sleeve 16 which is mounted on the spindle 12. The main member 15 has equally spaced radial notches or recesses 17 therein leaving immediate arms 18 with stepped portions 19 and 20 having outer threaded surfaces 21 and 22 respectively. Resilient outer jaws 22 are formed from a single tubular-like element with internal threads 24 adapted for interengagement with the threads 22 of the portion 20. Spaced vertical slots 25 in the tubular structure form the spaced resilient outer jaws 22. The outer jaws 22 have tapered surfaces 26 to be engaged by similarly tapered or conical surface 27 of an actuator 28. The jaws 22 have upper reference surfaces 29 upon which an outer part 30 may rest while the inner surfaces 31 of the outer jaws may grip a portion 32 of the part to assure location of the center line of the part and its opening 33 coincident with the main center line of the fixture. The outer part 30 is dotted as if in cross-section to illustrate the general contour thereof.

As illustrated in Fig. 1, the outer part 30 is constructed largely of metal including, however, a tubular glass portion 36 disposed concentric with the center line of the outer part and adapted to receive a glass portion 37 fused to a metal tubular stem 38 so that the annular flange 39 of the glass portion, together with the stem 38 will be positioned and sealed centrally within the outer part. Sealing takes place through the application of heat from burners 40 to the flange 39 and the top of the glass portion 36 during rotation of the fixture on the spindle 12.

An internally threaded element or nut 44 having an inwardly projecting annular flange 45 to engage an outwardly projecting annular flange 46 of the actuator 28 is adapted, through its threaded engagement with the portion 19 of the main member 15 to cause actuation of the outer jaws 22 into open and closed positions.

Inner jaws 48 are produced from a single tubular structure 49 threadedly mounted in a recess 50 of the main member 15. The inner jaws 48 are similar in structure to the outer jaws 22 in that the vertical slots 51 in the tubular structure produce the resilient jaws so that movement of an actuator 52 with its tapered aperture 53 engaging the tapered surfaces 54 of the inner jaws will move the inner jaws from their normally open positions, where they may receive the inner part 38, until the jaws are closed to grip the inner part with its center line coincident with the main center line of the fixture and the center line of the outer part. This is brought about due to the fact that the center line of the inner jaws 48 is coincident with the main center line of the fixture. The actuator 52 is tubular in general contour with the exception of its lower end, it being provided with vertical notches 56 to straddle the radially projecting arms 18 of the main member 15 and to move freely in the recesses 17. The lower ends of the remaining portions 59 between the notches 56 of the actuator 52 are threaded at 60 to receive an internally threaded nut or actuating element 61 mounted thereon and having a surface 62 adapted to abut against the adjacent surface of the main member 15.

A rest or locating rod 64 has its lower end threadedly mounted in a central aperture 65 of the main member 15 while its upper end 66 is positioned to a given distance from the reference surfaces 29 of the outer jaws 22 to support the inner part 38 and locate it with the flange portion 39 of the stem 38 at a desired position within the glass tube 36 of the outer part 30.

Before considering the function of the holding fixture, let it be assumed that the outer and inner gripping jaws are in their normal open positions. At certain stations about the periphery of the machine of which this fixture is a part, the outer part 30 may be positioned in the fixture so that it will rest upon the reference surfaces 29 of the outer jaws 22. The nut-like element 44 may be rotated in a given direction to cause movement of the actuator 28 to close the outer jaws 22 on the portion 32 of the outer part to thereby secure the outer part in the fixture and assure positioning of its center line coincident with the main center line of the fixture. At this or at another station, the stem 38 with its glass portion 37 and flange 39 may be dropped or lowered into the outer part until the lower end of the stem 38 comes to rest upon the upper surface 66 of the rod 64. This assures the vertical position of the stem and actuation of the nut-like element 61 to move the actuator 52 downwardly to close the inner jaws 48 about the adjacent portion of the stem, will move the stem into and hold it in a position whereby its center line will be coincident with the center line of the outer part and the main center line of the fixture.

With this fixture, no skill is required in initially mounting the inner and outer parts in the fixture and actuating the nut-like elements 44 and 61. However, the extreme accuracy of mounting both the outer and inner jaws on a single member, that is, the main member 15 and assuring their positions centrally with respect to each other and the center line of the fixture makes it impossible, through the actuation of the nut-like elements 44 and 61, to move their actuators 28 and 52 to produce other than perfect positioning and centering of the parts so that during rotation of the fixture relative to the burners 40, the parts may be sealed.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fixture for holding an elongate inner part centrally in a centrally apertured outer part having a reduced centrally positioned lower portion to be gripped, the fixture comprising a body having a centerline, a first cylindrical element disposed concentric with the centerline, fixed at one end to the body and having resilient jaws at the other end adapted to support the outer part and when normally open to receive the reduced portion, a first actuator movable relative to the body and the first cylindrical element to close the jaws on the reduced portion and firmly hold the outer part with its aperture concentric with the centerline, a second cylindrical element disposed in the first cylindrical element concentric with the centerline, fixed at one end to the body and having resilient jaws at the other end to receive the inner part when moved through the aperture of the outer part, and a second actuator extending into the first element and movable relative to the body and the second cylindrical element to close the resilient jaws of the second element on the inner part to locate and hold it centrally in the aperture of the gripped outer part.

2. A fixture for holding an elongate inner part centrally in a centrally apertured outer part having a reduced centrally positioned lower portion to be gripped, the fixture comprising a body having a centerline, a first cylindrical element disposed concentric with the centerline, fixed at one end to the body and having resilient jaws at the other end adapted to support the outer part and when normally open to receive the reduced portion, a first actuator movable relative to the body and the first cylindrical element to close the jaws on the reduced portion and firmly hold the outer part with its aperture concentric with the centerline, a second cylindrical element disposed in the first cylindrical element concentric with the centerline, fixed at one end to the body and having resilient jaws at the other end to receive the inner part when moved through the aperture of the outer part, a second actuator extending into the first element and movable relative to the body and the second cylindrical element to close the resilient jaws of the second element on the inner part to locate and hold it centrally in the aperture of the gripped outer part, and a member mounted on the body and extending a given distance into the second cylindrical element to locate the inner part at a predetermined position in the gripped outer part.

3. A fixture for holding an elongate inner part centrally in a centrally apertured outer part having a reduced centrally positioned lower portion to be gripped, the fixture comprising a body having a centerline, a first cylindrical element disposed concentric with the centerline, fixed at one end to the body and having resilient jaws at the other end adapted to support the outer part and when normally open to receive the reduced portion, a first actuator disposed in engagement with the resilient jaws of the first cylindrical element, a member threadedly connected to the body and movable relative to the first actuator to move the actuator to close the jaws of the first element on the reduced portion and firmly hold the outer part with its aperture concentric with the centerline, a second cylindrical element disposed in the first cylindrical element concentric with the centerline, fixed at one end to the body and having resilient jaws at the other end to receive the inner part when moved through the aperture of the outer part, a second actuator extending into the first element in engagement with the resilient jaws of the second element, and a rotatable member held against axial movement by the body and threadedly connected to the second actuator to cause the second actuator to close the jaws of the second element on the inner part to locate and hold it centrally in the aperture of the gripped outer part.

References Cited in the file of this patent

UNITED STATES PATENTS

| 1,569,185 | Higgins | Jan. 12, 1926 |
| 2,023,628 | Van Sant | Dec. 10, 1935 |
| 2,324,385 | Gustin et al. | July 13, 1943 |
| 2,585,510 | Smith | Feb. 12, 1952 |